(12) United States Patent
Brown

(10) Patent No.: X9862
(45) Date of Patent: Jul. 2, 1836

(54) WATER WHEEL

(76) Inventor: William F. Brown

William H. Brown of Augusta and State of Maine.

The Schedule referred to in these Letters Patent and making part of the same Containing a description, in the words of the said William French Brown himself, of his Improvement in the Under Shot Water Wheel. ...........

---

Be it known, that I William French Brown, of Augusta, Kennebec County & State of Maine, have made an improvement in the under shot water wheel, which is described as follows: ..................

—— This wheel is constructed of a Shaft of Wood or Iron, having a horizon-tal projecting base; flights or buckets of curved Shape; also an upward inclined Shute, at the bottom of the wheel — The Shaft of the wheel is about twenty feet in Length and of diameter suitable to the strength of Wood or iron of which it may be made; the length of this upright Shaft will depend on the size of the mill, and the upper part of the Shaft is secured by the framing of the mill, and the lower by a common gudgeon & box. On the lower part of the Shaft is placed a horizontal projecting base, or block wheel, usually eighteen inches thick, & three feet eight inches in diameter; but may be enlarged according to the power required. The flights or buckets are secured by spikes or screws — on the block wheel, or base, by flanges cast or cut on the flights whether made of cast or sheet iron. On the circumference of the block wheel are thus fastened about seventeen flights, more or less, as required; and about three feet long. The lower ends are placed about 8 inches apart, and rising in a gentle curve their upper ends approach to within one inch of each other. —— The upward inclined Shute, at the bottom of the wheel is formed of wood or iron, of the size of the wheel. It has a Channel about six inches wide corresponding to the width of the flights, and of about seventeen inches depth, where the water enters from the penstock of the common construction. The inclined Shute lessens the space for the passage of the water, till the shute is terminated by its own circumference. It is enclosed by a curb of height sufficient to contain the wheel and Open at the loss, unless curved by the Stream. This wheel may operate vertically as well as horizontally & enclosed in a curb with its ends open for the egress of the water. Two or more ranges of flights may be attached to a horizontal Shaft, leaving space sufficient for the water between each range, that its pressure may be received each way. This Wheel will answer as a tide wheel, by dispensing with the inclined Shute, having gates set on the opposite sides of the Curb.

—— Operation —— The water descending from the penstock rushes against the first flight presented about 10 inches in depth, the second 11 — the third 12, & so on till the seventeen flights are submerged, the water being conducted by the inclined Shute till it passes from the upper part of the wheel, where it runs over the curb. —— For a further illustration of my invention, I refer to the model & drawing deposited in the Patent Office.

—— What I claim as my invention, and for which I solicit Letters Patent is the above described Undershot Water Wheel; and particularly the curved flights or buckets, & the upper inclined Shute, for grist, saw & other mills.

Witnesses
Wait Smith
J. A. Elliot

[illegible] William H. Brown

Exd WH.

Patented 2d July 1836.

[illegible]